Figure 5:
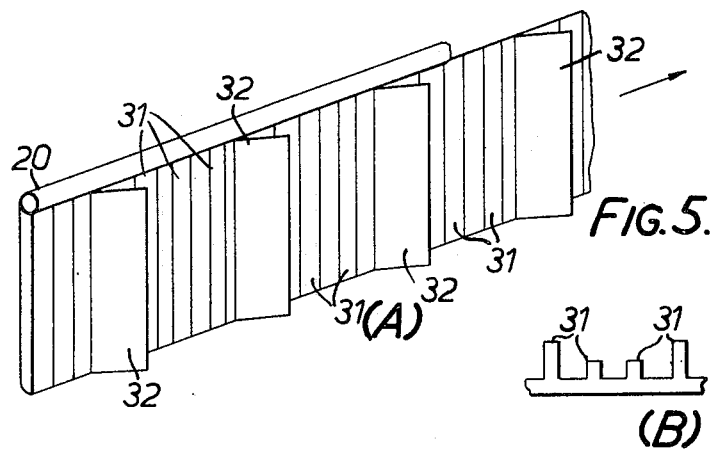

United States Patent [19]  [11] 3,949,194
Catto et al.  [45] Apr. 6, 1976

[54] CHECK-OUT TERMINAL
[75] Inventors: Christopher John Dignet Catto, Cambridge; Nigel Victor Charman, Wimbourne, both of England
[73] Assignee: Plessey Handel und Investments A.G., Beeston, England
[22] Filed: Mar. 20, 1974
[21] Appl. No.: 453,036

[30] Foreign Application Priority Data
Apr. 4, 1973 United Kingdom............... 16017/73

[52] U.S. Cl. .... 235/61.11 E; 198/165; 340/146.3 F
[51] Int. Cl.² G06K 7/10; B65G 15/14; G06K 13/04
[58] Field of Search............. 198/160, 165, DIG. 15; 250/566, 568, 569, 570; 235/61.11 R, 61.11 E, 61.11 D; 360/2, 88; 340/146.3 F

[56] References Cited
UNITED STATES PATENTS

| | | | |
|---|---|---|---|
| 442,751 | 12/1890 | Stephan | 198/DIG. 15 |
| 2,776,528 | 1/1957 | Niederer | 198/165 X |
| 2,806,582 | 9/1957 | Sindzinski | 198/165 X |
| 2,997,156 | 8/1961 | Frazier | 198/165 |
| 3,004,702 | 10/1961 | Kranz | 235/61.11 E |
| 3,676,645 | 7/1972 | Fickenscher | 235/61.11 E |
| 3,699,312 | 10/1972 | Jones | 235/61.11 E |
| 3,708,655 | 1/1973 | Schanne | 235/61.11 E |
| 3,728,677 | 4/1973 | Munson | 340/146.3 F |
| 3,738,260 | 6/1973 | Navi | 198/165 |

Primary Examiner—Bernard Konick
Assistant Examiner—Robert M. Kilgore
Attorney, Agent, or Firm—Scrivener Parker Scrivener & Clarke

[57] ABSTRACT

A check-out terminal wherein coded data identifying articles being checked out is carried past an optical code reading system at a substantially constant distance away includes a tilted main conveyor belt and at least two subsidiary conveyor belts arranged along a longitudinal side edge of the main conveyor belt in a manner such that the major surface of each of the subsidiary belts is substantially at right angles to the major surface of the main belt. The subsidiary belts are arranged so that when relative movement is produced between the articles carried by the conveyor belts and the optical code reading system, the coded data identifying the articles is exposed to the optical code reading system.

14 Claims, 6 Drawing Figures

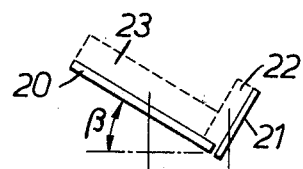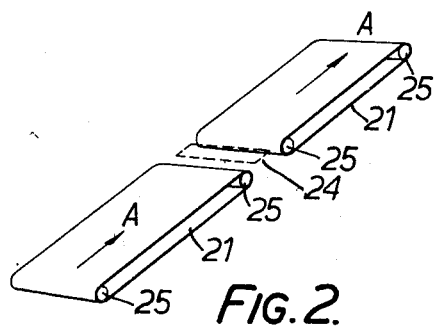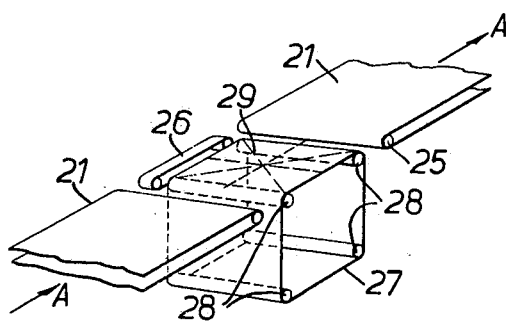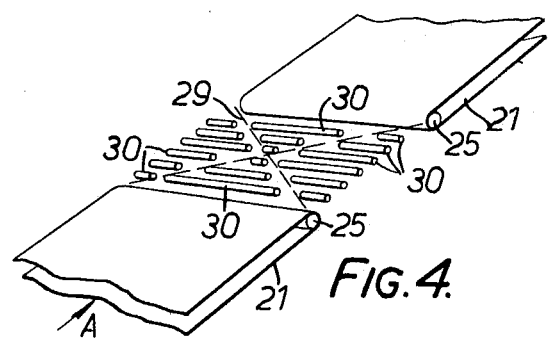

CHECK-OUT TERMINAL

The invention relates to a checkout terminal having a particular but not necessarily an exclusive application at supermarket checkout points.

The automatic scanning of labels, particularly at supermarket checkout points, requires a scanning head allied to some kind of feed or conveyor system which is arranged such that coded labels or markings can be read reliably by the checkout system and such that the checkout system operator can intervene in the event of faulty labels or markings or if an article gets jammed in the system, and ensure that cutomers do not by-pass the scanner. In known systems, the checkout system operator has to physically drag the articles being checked over a trasparent scanning slit. This known arrangement does not give an appreciable saving in labour and introduces the change of errors caused by variable dragging speeds and dirt or scratch-marks on the transparent scanning slit.

The invention provides a checkout terminal wherein coded data identifying articles being checked out is carried past an optical code reading system at a substantially constant distance away includes a tilted main conveyor belt and at least two subsidiary conveyor belts arranged along a longitudinal side edge of the main conveyor belt in a manner such that the major surface of each of the subsidiary belts is substantially at right angles to the major surface of the main belt, the subsidiary belts being arranged so that when relative movement is produced between the articles carried by the conveyor belts and the optical code reading system, the coded data identifying the articles is exposed to the optical code reading system.

Figure 6:
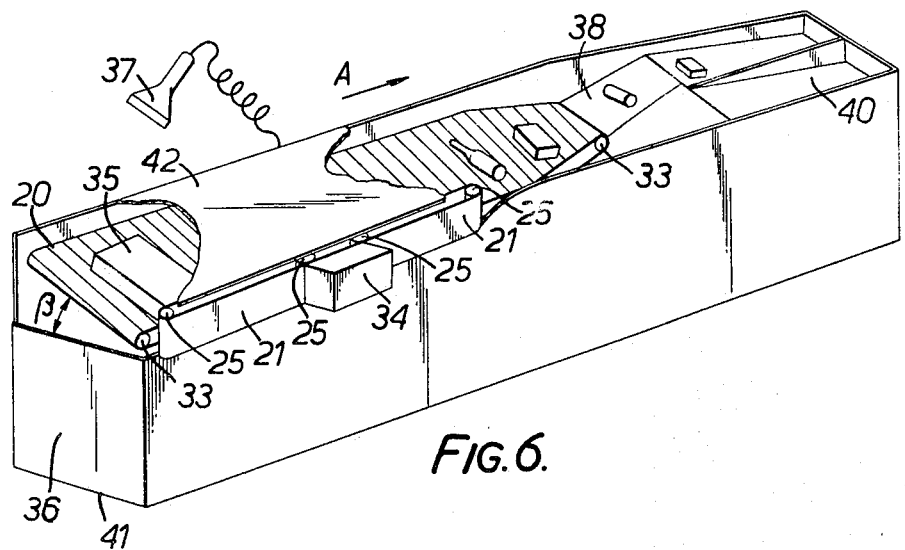

The foregoing and other features according to the invention will be better understood from the following description with reference to the accompanying drawings in which:

FIG. 1 diagrammatically illustrates, in an end elevation, a conveyor system for a checkout terminal according to the invention, FIGS. 2 to 5 diagrammatically illustrate, in perspective views, alternative arrangements for the conveyor system of FIG. 1, and FIG. 6 diagrammatically illustrates, in a perspective view, a checkout terminal which can include any one of the conveyor systems of FIGS. 1 to 5.

In a checkout terminal according to the present invention, the conveyor system utilises, as is diagrammatically illustrated in FIG. 1 of the drawings, a main conveyor belt 20, tilted at a controlled angle B, and at least two subsidiary belts, such as the belt 21, arranged in line, and at 90° to the main belt 20. The belts 20 and 21 are arranged in such a way that whether the package, bottle, jar, box etc. is a 'tall' article, such as the package 22, or a 'squat' article such as the package 23, it can be supported in a stable position by the belts 20 and 21, as illustrated in FIG. 1. The articles 22 and 23 have coded labels or markings on the side touching the subsidiary belts 21 and for a scanning system that requires a single scanning slit, there are, as illustrated in FIG. 2 of the drawings, two subsidiary belts 21, arranged one after the other with a small gap 24 therebetween. The belts are each driven in the direction of the arrows 'A' and are guided by rollers 25 or the like. The single scanning slit 26 is located in the gap 24 and is situated just below the upper surface of the belts 21, the light reflected or transmitted by the coded labels or markings being detected by an optical code reader as the articles pass the gap between the belts 21.

Optical code systems that can be read regardless of their orientation by a single slit scanner system are known and are ideally suited for the conveyor system of FIGS. 1 and 2. However, cartons, such as packets of breakfast cereal, which can only fit on the conveyor with one of the large faces downwards, can utilise a simpler coded label system.

For a scanning system that requires more than one slit, a more complex arrangement of othe subsidiary belts is required in order to allow the scanning slits to be exposed to the light reflected or transmitted by the coded label or markings on the article as it passes the slits. Two arrangements for the subsidiary belts of the conveyor system of FIG. 1 when used with a multi-slit scanning system are diagrammatically illustrated in FIGS. 3 and 4 of the drawings.

Referring to FIG. 3 of the drawings, a light transparent belt 27 guided by rollers 28 or the like is situated in the gap between the two subsidiary belts 21 and in front of the multi-slit scanning system 29. A narrow rubber or similarly robust belt 26 guided by rollers or the like is also situated in the gap between the belts 21 and is, in practice, situated at the foot of the main conveyor belt of FIG. 1. By this means, tall or large articles are supported by the belt 26 and need not touch the transparent belt 27, thereby reducing the likelihood of scratches. Similarly, for squat articles, the majority of the weight will be taken by the belt 26, the transparent belt 27 only being required to provide a small balancing force for the articles as they are conveyed past the scanning system 29.

Referring to FIG. 4 of the drawings, a series of rollers or small rubber wheels 30 or the like are situated in the gaps between the scanning slits of the multi-slit scanning system 20 and provide a continuation of the conveying surfaces of the subsidiary belts 21 thereby allowing the articles being checked to move smoothly from one subsidiary belt to the other. The scanning system 29 is situated below the surface of the rollers or wheels 30. The narrow rubber belt 26 of FIG. 3 may also be included in this arrangement and when so fitted it would perform the same function as it does with the arrangement of FIG. 3. Those gaps between the scanning slits where it is impractical to fit rollers or wheels, can be filled-in with a low-friction material such as PTFE.

In order to prevent round items such as bottles, tins or the like from rolling around on the belts, the main belt 20 of FIG. 1 can be provided with lateral ribs 31 as illustrated in FIGS. 5(A) and (B). In addition the main belt can be divided into sections by means of vertical fins 32 in order to effect a reduction in the ambient lighting at the scanning area.

Thus, with the conveyor system of FIGS. 1 to 5 the coded labels on the articles being checked or identified are carried past the optical scanning system at a substantially constant distance away, without incurring some of the penalties such as operator fatigue and susceptibility to dirt and scratches prevalent in known systems.

One arrangement for a checkout terminal which can incorporate any one of the conveyor systems of FIGS. 1 to 5 is diagrammatically illustrated in FIG. 6 of the drawings and includes the tilted main conveyor belt 20 which is guided by rollers, such as the roller 33, two subsidiary belts 21 guided by the rollers 25, and an optical scanning system 34.

Articles, such as the packet 35, are loaded onto the belt 20 at the end 36 of the terminal and the main and subsidiary belts cause the articles, in a manner as previously outlined, to be conveyed past the scanning system 34 in a manner such that a coded label or marking on the article can be read. Large articles could have labels or markings on all the narrow sides thereby ensuring that a coded label is presented to the scanning system 34, but, in any event, users of the terminal could be instructed that one label must be face-down on the subsidiary belts before identification can be effected. The terminal could, however, include means (not illustrated) for advising the terminal operator when an article without a label is conveyed past the scanning system 34.

The main conveyor belt 20 could also be caused to vibrate gently at the end 36 of the terminal in order to cause the articles to be moved down the main belt 20 until the surface of the article carrying the coded label or marking is in contact with the first subsidiary belt 21.

The terminal housing 41 is provided with a cover 42 in the scanning area in order to reduce ambient lighting and a manual optical scanning head 37 is provided in order to allow the terminal operator to scan those articles whose shape and/or size do not permit them to be conveyed past the scanning system 34.

After passing the scanning system 34, the main belt 20 twists towards the horizontal, and gently unloads the articles onto a separate belt section 38 which can be swung by means not illustrated into alignment with each of two padded unloading chutes 39 and 40. This facility allows one user of the terminal to remove scanned articles from one chute whilst another user is having articles processed through the scanning system.

It is to be understood that the foregoing description of specific examples of this invention is made by way of example only and is not to be considered as a limitation in its scope.

What is claimed is:

1. A checkout terminal wherein coded data identifying articles being checked out is carried past an optical code reading system at a substantially constant distance away includes a main conveyor belt and at least two subsidiary conveyor belts arranged along a longitudinal side edge of the main conveyor belt in a manner such that the major surface of each of the subsidiary belts is substantially at right angles to the major surface of the main belt, the main belt being tilted downward on the said longitudinal side edge, the subsidiary belts being arranged so that when relative movement is produced between articles carried by the conveyor belts and the optical code reading system, the coded data identifying the article is exposed to the optical code reading system, and the two subsidiary conveyor belts are spaced-apart along the longitudinal side edge of the main conveyor belt and wherein the optical code reading system has a single scanning slit which is located in the space between the subsidiary belts.

2. A checkout terminal as claimed in claim 1 wherein two subsidiary conveyor belts are provided and spaced-apart along the longitudinal side edge of the main conveyor belt, wherein the optical code reading system has a multi-slit scanning system which is located in the space between the subsidiary belts and wherein the terminal includes a series of rollers, or wheels or the like situated in the gaps between the scanning slits of the optical code reading system.

3. A checkout terminal as claimed in claim 2 wherein a further narrower subsidiary belt is provided and situated in the space between the other subsidiary belts in a position immediately adjacent to the longitudinal side edge of the main conveyor belt.

4. A checkout terminal as claimed in claim 1 wherein three subsidiary conveyor belts are provided, the middle one of which is of a light transparent material and wherein the optical code reading system is situated behind the conveying surface of the transparent subsidiary belt.

5. A checkout terminal as claimed in claim 4 wherein the transparent subsidiary belt is narrower than the other two subsidiary belts and is spaced-apart from the longitudinal side edge of the main conveyor belt and wherein a further subsidiary belt is provided and situated in the space between the amin and the transparent conveyor belts.

6. A checkout terminal as calimed in claim 1 wherein the main conveyor belt is provided with a ribbed conveying surface.

7. A checkout terminal as claimed in claim 6 wherein the ribs are lateral ribs.

8. A checkout terminal as claimed in claim 1 wherein the conveying surface of the main conveyor belt is divided into sections by means of vertical fins in order to effect a reduction in the ambient lighting at the scanning area.

9. A checkout terminal as claimed in claim 2 wherein the main conveyor belt is provided with a ribbed conveying surface.

10. A checkout terminal as claimed in claim 9 wherein the ribs are lateral ribs.

11. A checkout terminal as claimed in claim 2 wherein the conveying surface of the main conveyor belt is divided into sections by means of vertical fins in order to effect a reduction in the ambient lighting at the scanning area.

12. A checkout terminal as claimed in claim 4 wherein the main conveyor belt is provided with a ribbed conveying surface.

13. A checkout terminal as claimed in claim 12 wherein the ribs are lateral ribs.

14. A checkout terminal as claimed in claim 4 wherein the conveying surface of the main conveyor belt is divided into sections by means of vertical fins in order to effect a reduction in the ambient lighting at the scanning area.

* * * * *